G. F. WEHMANN & L. G. WULBERN.
AUTOMATIC SAFETY VALVE.
APPLICATION FILED MAY 5, 1915.
1,164,436. Patented Dec. 14, 1915.
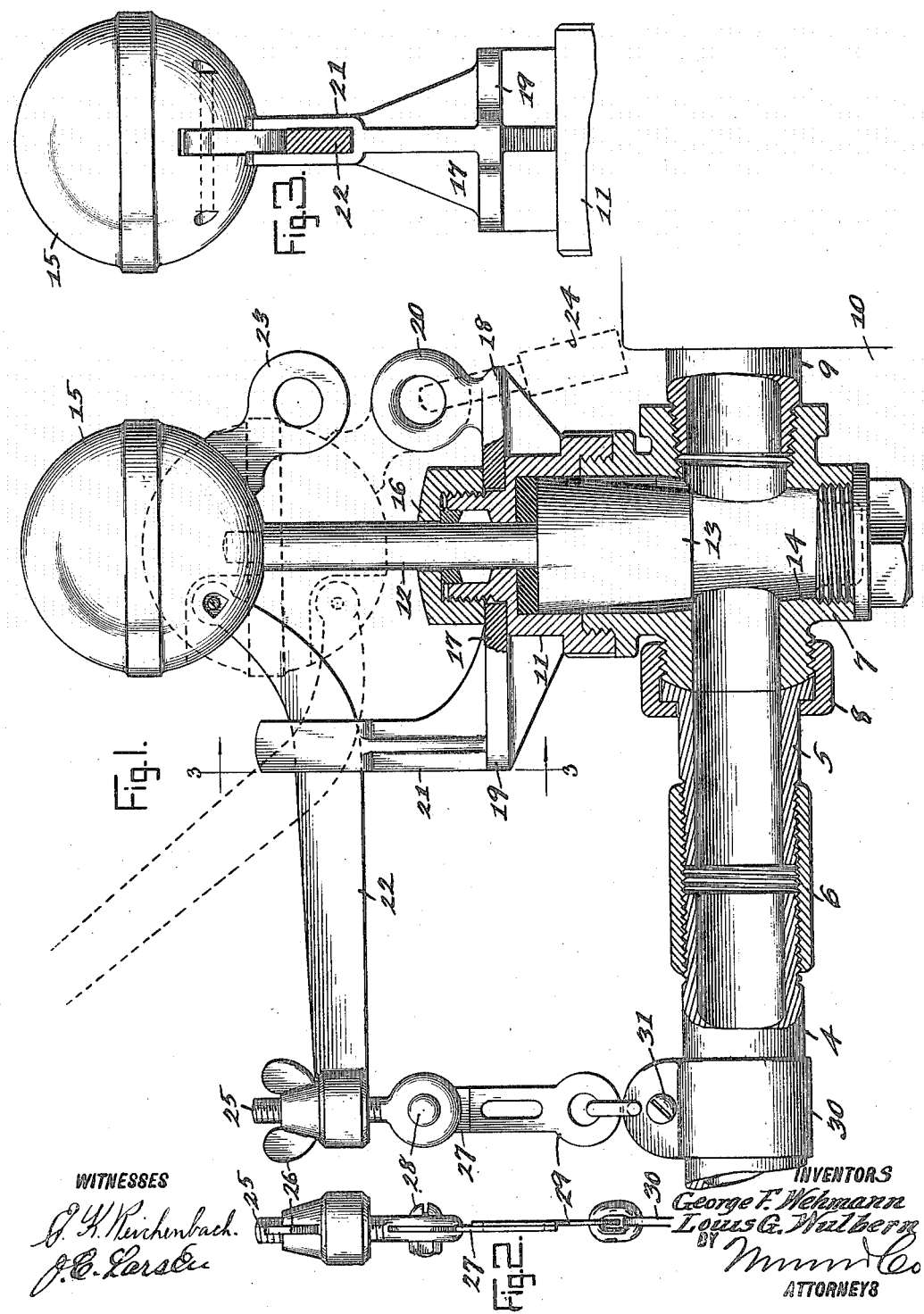

UNITED STATES PATENT OFFICE.

GEORGE F. WEHMANN, OF NEW YORK, N. Y., AND LOUIS G. WULBERN, OF CHARLESTON, SOUTH CAROLINA.

AUTOMATIC SAFETY-VALVE.

1,164,436.　　　　Specification of Letters Patent.　　Patented Dec. 14, 1915.

Application filed May 5, 1915. Serial No. 26,060.

*To all whom it may concern:*

Be it known that we, GEORGE F. WEHMANN, of New York, borough of Brooklyn, county of Kings, and State of New York, and LOUIS G. WULBERN, of Charleston, in the county of Charleston and State of South Carolina, citizens of the United States, have invented certain new and useful Improvements in Automatic Safety-Valves, of which the following is a specification.

Our invention relates to safety valves, particularly for gas pipes, and the main object thereof is to provide such valves which automatically close when the surrounding atmosphere reaches a predetermined point.

Our invention has especial reference to the use thereof in dark cellars wherein disastrous explosions frequently occur due to persons carelessly looking for gas leaks with an open light or by striking matches; when such explosions occur and no safety devices such as ours are employed the gas continues to escape and is ignited, thus endangering the building in which the explosion had occurred and rendering it impossible for firemen to enter the cellar to fight the fire, and it was to overcome this that our invention was conceived.

Our invention is fully described in the following specification, of which the accompanying drawings form a part, in which like reference characters refer to like parts in each of the views, and in which :—

Figure 1 is a side elevation of a valve constructed in accordance with our invention, partly in section, with the parts in normal positions; Fig. 2 is a fragmentary end view thereof; and Fig. 3 is a section taken on the line 3—3 of Fig. 1.

In the drawings forming a part of this application we have shown a present preferred form of embodiment of our invention, comprising a gas pipe 4 having a flanged section 5 detachably connected therewith by means of a coupling 6, said flanged section being held on a valve casing 7 by means of a gland 8, a section 9 of pipe connecting said valve casing with the meter 10 shown fragmentarily. The valve casing 7 has a bonnet 11 in detachable connection therewith through which passes a stem 12 for a cone valve 13 adapted to be seated at 14 to close communication between the pipes 4 and 9 and thus shut off the meter, said stem carrying a weight 15 to insure such valve seating by gravity when permitted to drop. Held between the bonnet 11 and packing gland 16 thereof is a bracket 17 provided with arms 18 and 19, the former of which carries a ring 20 and the latter of which carries a forked standard 21 serving as a seat for a lever 22 in pivotal connection with the weight 15, and said weight carries a ring 23 adapted to register with the ring 20 in the lowered position of the valve, thereby permitting the insertion of the bow of a pad-lock 24 to lock the valve in such position and thus shut off the meter and the gas supply to the building. The outer end of the lever 22 has an eye-bolt 25 vertically arranged therein and adjustable by means of a wing-nut 26, said bolt being connected to a plate 27 by means of a pin 28; connected with the plate 27, by means of any suitable fusible material, is a complemental plate 29 in turn connected with a clamp 30 held on the pipe 4 by means of a bolt 31, the connected plates 27 and 29 jointly forming a fusible element which holds the outer end of the lever 22 in lowermost position and thus holds the weight 15 and valve 13 in uppermost position.

The operation of the device is obvious:— When a fire occurs in the vicinity of the valve, the material connecting the plates 27 and 29 is melted and permits said plates to separate, and thus permits the valve 13 to find its seat through gravity, but we could, just as readily, employ a spring to insure such valve seating instead of the gravity means shown. It will thus be seen that, by means of our valve, the gas is entirely closed off from a building when the temperature reaches a point at which the material connecting the plates 27 and 29 is fused; also, an authorized person may, if desired, shut off the gas supply from the building by locking the valve in closed position, as when the occupant of the building does not pay the gas bills and it is not desired to remove the meter, or when the occupants are closing their home for a long period.

While we have shown the valve as closely adjacent the meter, we may locate the same in any desired position, and, while we have shown certain preferred details of construction, we do not limit ourselves thereto, but may make changes thereover, within the scope of the following claim, without departing from the spirit of our invention, or sacrificing its advantages.

Having fully described our invention, what we claim as new, and desire to secure by Letters Patent, is:—

The combination with a meter and a gas supply pipe; of a valve casing in said pipe, a bonnet on said casing, a valve in said casing provided with a stem projecting through said bonnet, a packing gland and packing on said bonnet, a bracket held between said bonnet and gland and provided with a ring at one end and a forked arm at the other end, a lever fulcrumed in said fork, a weight carried by said valve stem and pivoted to said lever, a ring on said weight adapted to be brought into register with said first named ring to receive a lock to secure said valve in closed position, and fusible means normally holding said lever to said pipe to maintain said valve in open position.

In testimony whereof I have signed my name to this specification in the presence of two subscribing witnesses.

GEORGE F. WEHMANN.

Witnesses:
J. C. LARSEN,
PHILIP D. ROLLHAUS.

In testimony whereof I have signed my name to this specification in the presence of two subscribing witnesses.

LOUIS G. WULBERN.

Witnesses:
B. P. DOTTERER,
GEO. W. BELL.